US012478707B2

(12) United States Patent
Zhong et al.

(10) Patent No.: US 12,478,707 B2
(45) Date of Patent: Nov. 25, 2025

(54) NANO-ZINC OXIDE-SUPPORTED BACTERIAL CELLULOSE MICROFIBER-ALGINATE FIBER COMPOSITE

(71) Applicants: Chunyan Zhong, Haikou (CN); Yuguang Zhong, Haikou (CN); Hainan Yeguo Foods Co., Ltd, Haikou (CN); Hainan Guangyu Biotechnology Co., Ltd, Haikou (CN); Nanjing Yeguo Foods Co., Ltd, Nanjing (CN); Baoding Guangyu Fruit Processing Food Co., Ltd., Baoding (CN)

(72) Inventors: Yuguang Zhong, Haikou (CN); Chunyan Zhong, Haikou (CN)

(73) Assignees: Yuguang Zhong, Haikou (CN); Chunyan Zhong, Haikou (CN); HAINAN YEGUO FOODS CO., LTD, Haikou (CN); HAINAN GUANGYU BIOTECHNOLOGY CO., LTD., Haikou (CN); NANJING YEGUO FOODS CO., LTD., Nanjing (CN); BAODING GUANGYU FRUIT PROCESSING FOOD CO., LTD., Baoding (CN)

( * ) Notice: Subject to any disclaimer, the term of this patent is extended or adjusted under 35 U.S.C. 154(b) by 671 days.

(21) Appl. No.: 17/857,543

(22) Filed: Jul. 5, 2022

(65) Prior Publication Data
US 2022/0331476 A1  Oct. 20, 2022

Related U.S. Application Data

(63) Continuation of application No. PCT/CN2020/070587, filed on Jan. 7, 2020.

(51) Int. Cl.
| | | |
|---|---|---|
| *A61L 15/28* | (2006.01) | |
| *A61L 15/18* | (2006.01) | |
| *D04H 3/015* | (2012.01) | |
| *D04H 3/16* | (2006.01) | |
| *D06M 11/44* | (2006.01) | |
| *D06M 15/05* | (2006.01) | |
| *D06M 101/04* | (2006.01) | |

(52) U.S. Cl.
CPC ............ *A61L 15/28* (2013.01); *A61L 15/18* (2013.01); *D04H 3/015* (2013.01); *D04H 3/16* (2013.01); *D06M 11/44* (2013.01); *D06M 15/05* (2013.01); *A61L 2400/12* (2013.01); *A61L 2430/34* (2013.01); *D06M 2101/04* (2013.01); *D10B 2509/00* (2013.01)

(58) Field of Classification Search
CPC .... A61L 15/28; D04H 1/43838; D04H 1/413; D04H 1/492; D06M 15/05; C08L 5/04
See application file for complete search history.

(56) References Cited

U.S. PATENT DOCUMENTS

| | | | |
|---|---|---|---|
| 10,342,890 B2 * | 7/2019 | Bray | A61L 15/18 |
| 2013/0245578 A1 * | 9/2013 | Bruder | A61F 7/02 |
| | | | 607/114 |
| 2018/0094369 A1 * | 4/2018 | Horridge | D04H 1/46 |

FOREIGN PATENT DOCUMENTS

| | | |
|---|---|---|
| CN | 101711887 A | 5/2010 |
| CN | 103480028 A | 1/2014 |
| CN | 104874015 A | 9/2015 |
| CN | 105418976 A | 3/2016 |
| CN | 105907811 A | 8/2016 |
| CN | 108899484 A | 11/2018 |
| WO | 2013176633 A1 | 11/2013 |
| WO | 2018030057 A1 | 2/2018 |
| WO | 2019107247 A1 | 6/2019 |

OTHER PUBLICATIONS

Varaprasad et al. Carbohydrate Polymers, 135, 349-355, 2016.*
International Search Report for International Application No. PCT/CN2020/070587 "Composite Material of Alginic Acid Fibers and Nano-Zinc Oxide-Loaded Bacterial Cellulose Microfibers", date of mailing: Sep. 25, 2020.
National Standard of People's Republic of China, GB/T20944.1-2007, Textiles—Evaluation for antibacterial activity—Part 1: Agar diffusion plate method, Issued on Jun. 14, 2007.
National Standard of People's Republic of China, GB/T 16886.5-2017, Biological evaluation medical devices—Part 5: Tests for in of in vitro cytotoxicity, Issued on Dec. 29, 2017.
National Standard of People's Republic of China, GB/T 16886.10-2005, Biological evaluation of medical' devices—Part 10: Test for irritation and delayed-type hypersensitivity, Issued on Mar. 23, 2005.
Masafumi Arakawa, "Introduction to Particle Size Measurement", Journal of the Society of Power Engineering, Japan vol. 17 No. 6, Jun. 10, 1980 (with JP Office Action for corresponding JP Application No. 2022-542053, "Nano-zinc oxide-supported bacterial cellulose microfiber-alginate fiber composite" Aug. 5, 2023.

(Continued)

*Primary Examiner* — Kyle A Purdy
(74) *Attorney, Agent, or Firm* — Hamilton, Brook, Smith & Reynolds, P.C.

(57) ABSTRACT

A nano-zinc oxide-supported bacterial cellulose microfiber-alginate fiber composite is described. The composite is obtained by absorbing nano-zinc oxide-supported bacterial cellulose microfibers on an alginate fiber spunlace nonwoven fabric; the nano-zinc oxide is uniformly distributed on the surface of the bacterial cellulose microfibers. This composite has good biocompatibility, mechanical properties and water absorption properties, and has a great application prospect in biomedical fields, such as wound dressings, human body repair materials, tissue engineering materials, etc.

17 Claims, No Drawings

(56) References Cited

OTHER PUBLICATIONS

Written Opinion for International Application No. PCT/CN2020/070587 "Composite Material of Alginic Acid Fibers and Nano-Zinc Oxide-Loaded Bacterial Cellulose Microfibers", date of mailing: Sep. 25, 2022.

International Preliminary Report on Patentability for International Application No. PCT/CN2020/070587 "Composite Material of Alginic Acid Fibers and Nano-Zinc Oxide-Loaded Bacterial Cellulose Microfibers", date of mailing: Sep. 25, 2022.

\* cited by examiner

NANO-ZINC OXIDE-SUPPORTED BACTERIAL CELLULOSE MICROFIBER-ALGINATE FIBER COMPOSITE

RELATED APPLICATION(S)

This application is a continuation of International Application No. PCT/CN2020/070587, which designated the United States and was filed on Jan. 7, 2020, published in Chinese, the entire teachings of the above application are incorporated herein by reference.

BACKGROUND

The invention belongs to the technical field of composite cellulose materials, and relates to a nano-zinc oxide-supported bacterial cellulose microfiber-alginate fiber composite.

Fiber materials have been widely used in the medical field for a long time. For example, dressing products are commonly used in the treatment of wounds, among which non-woven fabrics prepared by spunlace using fibrous materials are a common type of dressing products. At present, the commonly used non-woven fabric dressing fiber materials in clinical practice include cotton fiber, viscose fiber, chitosan fiber, alginate fiber, etc. In addition, with the development of tissue repair medicine, more and more fibrous materials are commonly used in the preparation of tissue repair scaffolds. Fibrous materials can be processed into complex hierarchical structures that mimic the extracellular matrix of tissues. At the same time, good mechanical properties, histocompatibility, cell permeability and the like can meet the basic requirements of tissue repair.

Bacterial celluloses are macromolecular compounds composed of glucose linked by β-1,4-glycosidic chains. As an excellent biological material, they have unique physical and chemical properties. Bacterial celluloses have a natural three-dimensional nano-network structure; high tensile strength and elastic modulus; high hydrophilicity, good air permeability, water absorption, water permeability, extraordinary water holding capacity and high wet strength. In addition, a large number of studies have shown that bacterial celluloses have good in vivo and in vitro biocompatibility and biodegradability, which makes bacterial celluloses themselves suitable for biomedical applications. The use of simple bacterial cellulose hydrogels as dressings has been reported abroad, and it has been industrialized for clinical use. In addition, various types of tissue repair scaffolds prepared from bacterial cellulose materials are often reported. It has been confirmed that bacterial cellulose materials can be used in the repair of blood vessels, bone, cartilage, urethra, tympanic membrane and other tissues and organs. However, the naturally fermented bacterial cellulose hydrogel is a dense three-dimensional network structure formed by cellulose nanofibers, which absorbs wound exudate slowly in wound repair, and is prone to breed bacteria and cause wound infection. In tissue repair, this dense structure hinders the entry of cells. The above problems all restrict the application of bacterial cellulose as a fiber material.

Therefore, how to take advantage of the natural nanofibers of bacterial cellulose and expand its application in the medical field is a key problem to be solved for bacterial cellulose materials.

SUMMARY

An object of the present invention is to provide a nano-zinc oxide-supported bacterial cellulose microfiber-alginate fiber composite. Another object of the present invention is to provide a production method of the nano-zinc oxide-supported bacterial cellulose microfiber-alginate fiber composite. A further object of the present invention is to provide use of the nano-zinc oxide-supported bacterial cellulose microfiber-alginate fiber composite in skin repair dressings, human body repair materials and tissue engineering materials.

The objects of the present invention are achieved through the following technical solutions:

In an aspect, the present invention provides a nano-zinc oxide-supported bacterial cellulose microfiber-alginate fiber composite obtained by absorbing nano-zinc oxide-supported bacterial cellulose microfibers on an alginate fiber spunlace non-woven fabric; the nano-zinc oxide is uniformly distributed on the surface of the bacterial cellulose microfibers.

In the composite, the content of the bacterial cellulose microfibrils and the content of the nano-zinc oxide are adjusted according to actual needs.

In the composite, preferably, the nano-zinc oxide has a particle size of 5-20 nm; the bacterial cellulose microfibers have an average diameter of 30-40 nm, an average length of 10-20 and a crystallinity of 60-75%; and the alginate fiber spunlace non-woven fabric has a gram weight of 40-100 $g/m^2$.

The nano-zinc oxide-supported bacterial cellulose microfiber-alginate fiber composite of the present invention has a macroscopically loose structure of non-woven fabric, nano-scale bacterial cellulose microfibers wound on the surface of micro-scale alginate fibers, and nano-zinc oxide particles uniformly distributed on the surface of the nano-scale microfibers. The average length and diameter of bacterial cellulose microfibers are concentrated, making it easy to prepare various nanocellulose fiber-based medical materials. The fiber composite with this special structure can be widely used in the fields of skin repair dressings, human body repair materials, tissue engineering materials, etc.

In another aspect, the present invention provides a production method of the nano-zinc oxide-supported bacterial cellulose microfiber-alginate fiber composite, comprising the following steps:

a bacterial cellulose hydrogel is dispersed and loosen to open in water to obtain a uniformly dispersed bacterial cellulose microfibril aqueous solution;

sodium alginate and zinc salt are added to the bacterial cellulose microfibril aqueous solution, and subjected to a heating treatment, to obtain a nano-zinc oxide-supported bacterial cellulose microfibril aqueous solution;

an alginate fiber spunlace non-woven fabric is immersed into the nano-zinc oxide-supported bacterial cellulose microfibril aqueous solution, and then freeze-dried, to obtain the nano-zinc oxide-supported bacterial cellulose microfiber-alginate fiber composite.

In the present invention, by means of dispersion and opening, the original bacterial cellulose three-dimensional fiber network was dispersed into stable and uniform bacterial cellulose microfibers, and nano-zinc oxide with antibacterial properties was synthesized in situ on its surface. Further, it is combined with alginic acid spunlace non-woven fabric to finally obtain a nano-zinc oxide-supported bacterial cellulose microfiber-alginate fiber composite. This composite has good biocompatibility, mechanical properties and water absorption properties, and has a great application prospect in biomedical fields, such as wound dressings, human body repair materials, and tissue engineering materials.

In the production method as described above, the amount of nano-zinc oxide-supported bacterial cellulose adsorbed on the alginate fiber spunlace non-woven fabric is adjusted according to actual needs, based on the self-adsorption saturation of the non-woven fabric as the standard.

In the production method as described above, preferably, the mass ratio of the he bacterial cellulose microfibers, the sodium alginate and the zinc salt in the bacterial cellulose microfibril aqueous solution is (5-10):(0.5-1):(3-5).

In the production method as described above, preferably, the zinc salt comprises one or a combination of more of zinc acetate, zinc nitrate, zinc bromide, zinc chloride and zinc sulfate.

In the production method as described above, preferably, the heating treatment is performed at a temperature of 40° C.-60° C. for 6-12 h. Under heating conditions, the positively charged zinc ions first interact with the negatively charged hydroxyl groups on the surface of bacterial cellulose nanofibers, and a large number of zinc ions are uniformly adsorbed on the surface of cellulose nanofibers; and, under heating conditions, zinc ions interact with the hydroxyl and ester bonds on the sodium alginate molecule to obtain nano-zinc oxides; the nano-zinc oxides are spherical particle with an average particle diameter of 5-20 nm, which are uniformly distributed on the surface of bacterial cellulose microfibers.

In the production method as described above, preferably, the bacterial cellulose hydrogel is obtained by fermentation of strains; the strains comprise one or a combination of more of *Acetobacter xylinum, Rhizobium, Sporosarcina, Pseudomonas, Achromobacter, Alcaligenes*, Aerobacter, and *Azotobacter*.

In the production method as described above, preferably, the bacterial cellulose hydrogel obtained by fermentation is further purified as follows:

the bacterial cellulose hydrogel is immersed in an NaOH aqueous solution with a mass percentage of 0.3%-1% at a temperature of 70-100° C. for 2-4 h, and then immersed in ansodium dodecyl sulfate aqueous solution with a mass percentage of 1%-5%; subsequently, it was repeatedly rinsed with distilled water until neutral to remove the bacterial proteins on the bacterial celluloses and the residual medium adhering to the cellulose membrane, to obtain the purified bacterial cellulose hydrogel.

In the production method as described above, preferably, the bacterial cellulose hydrogel is dispersed and loosen to open in the water as follows:
  the bacterial cellulose hydrogel is cut and boiled in the water, and then homogenized in a high-speed disperser, to obtain a bacterial cellulose microfibril aqueous solution;
  subsequently, the bacterial cellulose microfibril aqueous solution is adjusted to a solid content of 0.8-2 wt %, and then homogenized in a high-pressure homogenizer;
  subsequently, the bacterial cellulose microfibril aqueous solution is adjusted to a solid content of 5-10 wt %, to obtain a uniformly dispersed bacterial cellulose microfibril aqueous solution.

In the prior art, the bacterial cellulose hydrogel obtained by fermentation is a three-dimensional network structure formed by nano-scale cellulose fibers, and it is difficult to disperse the cellulose fibers uniformly due to hydrogen bonding between the nano-fibers of bacterial cellulose. In the present invention, the process of multiple dispersion (high-speed dispersion, high-pressure homogenization) is adopted to gradually disperse the cellulose fibers uniformly in the aqueous solution. Also, by using an opening treatment, the average length and diameter distribution of the fibers can be concentrated. At the same time, the crystallinity of cellulose fibers has been reduced to a certain extent compared with the existing 85%-90%. This indicates that the amorphous area of the fibers increases during the treatment process, which facilitates to improve the adsorption performance and subsequent processing performance of the fibers.

In the production method as described above, preferably, 0.2-0.4 wt % carboxymethyl cellulose is further added to the bacterial cellulose microfibril aqueous solution. Usually, when the dispersion solution of nanocellulose fibers is autoclaved, due to the high temperature environment, the aggregation of nanofibers will be promoted, which will affect the subsequent processing. A small amount of carboxymethyl cellulose added can act as a stabilizer to prevent the aggregation of nanocellulose fibers in the system, while ensuring the stability of the bacterial cellulose microfibril aqueous solution after sterilization.

In the production method as described above, preferably, the bacterial cellulose hydrogel is cut into shapes including, but not limited to, a cube, a cuboid or a sphere; more preferably, it is cut into a cube with a side length of 0.5-1 cm.

In the production method as described above, preferably, the cut hydrogel is boiled for 10-30 min.

In the production method as described above, preferably, the homogenization is performed in the high-speed disperser at a 5000-25000 rpm for 5-10 min.

In the production method as described above, preferably, the homogenization is performed in 10-60 times through the microtubule channel in the high-pressure homogenizer at a pressure of 130-170 MPa.

In the present invention, high-speed disperser and high-pressure homogenizer are respectively used for dispersing and homogenizing treatment in turn. This method can disperse the nanofibers of bacterial cellulose to the greatest extent, while ensuring the uniformity of the microfibers, which is beneficial to the subsequent processing.

In the production method as described above, preferably, the alginate fiber spunlace non-woven fabric is a non-woven fabric obtained by processing alginate fibers by a conventional spunlace method.

In the production method as described above, preferably, the alginate fibers are those obtained by conventionally wet-spinning the sodium alginate aqueous solution and then forming alginate fibers in a calcium chloride coagulation bath, wherein the fibers have a diameter of 5-10 μm.

In the production method as described above, preferably, the alginate fiber spunlace non-woven fabric is immersed in the nano-zinc oxide-supported bacterial cellulose microfibril aqueous solution at room temperature for 12-24 h.

The nano-zinc oxide-supported bacterial cellulose microfiber-alginate fiber composite obtained by adsorbing the nano-zinc oxide-supported bacterial cellulose microfibril aqueous solution on the alginate fiber spunlace non-woven fabric has a hierarchical structure. The composite has a macroscopically loose structure of wet-spun non-woven fabric, nano-scale bacterial cellulose microfibers wound on the surface of micro-scale alginate fibers, and nano-zinc oxide particles uniformly distributed on the surface of the nano-scale microfibers.

In the production method as described above, preferably, the solid content of nano-zinc oxide-supported bacterial cellulose microfibrils in the nano-zinc oxide-supported bacterial cellulose microfibril aqueous solution is further adjusted by an autoclave prior to immersing, such that the content of the nano-zinc oxide-supported bacterial cellulose microfibers in the nano-zinc oxide-supported bacterial cellulose microfibril aqueous solution is 10-20 wt %.

In the production method as described above, preferably, a sterilization is carried out at a temperature of 121° C. and a pressure of 0.12 MPa for 15-30 min. Sterilization treatment is a necessary process when medical materials are made into end products, and the autoclave sterilization of the present invention is a convenient and feasible means.

In yet another aspect, the present invention provides use of the nano-zinc oxide-supported bacterial cellulose microfiber-alginate fiber composite in skin repair dressings, human body repair materials or tissue engineering materials The present invention has the following beneficial effects:
(1) In the present invention, by means of dispersion and opening, the original bacterial cellulose three-dimensional fiber network was dispersed into stable and uniform bacterial cellulose microfibers, and nano-zinc oxide with antibacterial properties was synthesized in situ on its surface. Further, it is combined with alginic acid spunlace non-woven fabric to finally obtain a nano-zinc oxide-supported bacterial cellulose microfiber-alginate fiber composite. This composite has good biocompatibility, mechanical properties and water absorption properties, and has a great application prospect in biomedical fields, such as wound dressings, human body repair materials, and tissue engineering materials.
(2) In the present invention, the process of multiple dispersion is adopted to gradually disperse the cellulose fibers uniformly in the aqueous solution. Also, by using an opening treatment, the average length and diameter distribution of the fibers can be concentrated. This is useful in the production of various nano-cellulose fiber-based medical materials.

DETAILED DESCRIPTION

A description of example embodiments follows.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

In order to have a clearer understanding of the technical features, purposes and beneficial effects of the present invention, the technical solutions of the present invention are now described in detail below, but should not be construed as limiting the scope of implementation of the present invention.

The experimental methods used in the following examples are conventional methods, unless otherwise specified.

The materials, reagents, etc. used in the following examples can be obtained from commercial sources, unless otherwise specified.

Example 1

This example provides a production method of a nano-zinc oxide-supported bacterial cellulose microfiber-alginate fiber composite, comprising the following steps:
(1) A bacterial cellulose hydrogel was obtained by fermentation of *Acetobacter xylinum*. At 100° C., the bacterial cellulose hydrogel was immersed in 0.3 wt % NaOH aqueous solution for 4 h, and then immersed in 1 wt % sodium dodecyl sulfate aqueous solution for 4 h. It was then repeatedly rinsed with distilled water until neutral to remove the bacterial proteins on the bacterial celluloses and the residual medium adhering to the cellulose membrane, to obtain the purified bacterial cellulose hydrogel.
(2) The purified bacterial cellulose hydrogel was cut into a cube with a side length of 0.5 cm. The cut bacterial cellulose hydrogel cube was boiled in boiling water for 10 min, and then the sample was homogenized using a high-speed disperser at 5000 rpm for 10 min, to obtain a bacterial cellulose microfibril aqueous solution.

The bacterial cellulose microfibril aqueous solution was adjusted to a solid content of 0.8 wt %. Then, the solution was homogenized 10 times through the microtubule channel in a high-pressure homogenizer at a pressure of 170 MPa.

The bacterial cellulose microfibril aqueous solution was adjusted to a solid content of 10 wt %, and then 0.4 wt % of carboxymethyl cellulose was added, to obtain a uniformly dispersed bacterial cellulose microfibril aqueous solution. The purified and loosen to open bacterial cellulose microfibers had an average diameter of 30 nm, an average length of 20 μm, and a crystallinity of 75%.
(3) 1 wt % sodium alginate and 5 wt % zinc acetate were added to the uniformly dispersed bacterial cellulose microfibril aqueous solution, respectively, and heated at 40° C. for 6 h, to obtain a nano-zinc oxide-supported bacterial cellulose microfibril aqueous solution, wherein nano-zinc oxides are spherical particle with an average particle diameter of 10 nm, which are uniformly distributed on the surface of bacterial cellulose microfibers.
(4) The sodium alginate aqueous solution was wet-spun to form alginate fibers having a diameter of 10 μm in a calcium chloride coagulation bath. Then, the alginate fibers were processed by a spunlace method to obtain an alginate fiber spunlace non-woven fabric with a gram weight of 40 g/m² is obtained by processing by spunlace method.

The nano-zinc oxide-supported bacterial cellulose microfibril aqueous solution in step (3) was put into an autoclave, and the content of nano-zinc oxide-supported bacterial cellulose microfibers in the system was adjusted to 10 wt %. Under a high temperature of 121° C. and high pressure of 0.12 MPa, a sterilization was carried out for 15 min, to obtain a sterilized nano-zinc oxide-supported bacterial cellulose microfibril aqueous solution.

The alginate fiber spunlace non-woven fabric was immersed in the sterilized nano-zinc oxide-supported bacterial cellulose microfibril aqueous solution at room temperature for 24 h. After being taken out, it was freeze-dried to obtain the nano-zinc oxide-supported bacterial cellulose microfiber-alginate fiber composite.

Example 2

This example provides a production method of a nano-zinc oxide-supported bacterial cellulose microfiber-alginate fiber composite, comprising the following steps:
(1) A bacterial cellulose hydrogel was obtained by fermentation of *Rhizobium*. At 90° C., the bacterial cellulose hydrogel was immersed in 0.4 wt % NaOH aqueous solution for 4 h, and then immersed in 2 wt % sodium dodecyl sulfate aqueous solution for 4 h. It was then repeatedly rinsed with distilled water until neutral to remove the bacterial proteins on the bacterial celluloses and the residual medium adhering to the cellulose membrane, to obtain the purified bacterial cellulose hydrogel.

(2) The purified bacterial cellulose hydrogel was cut into a cube with a side length of 0.6 cm. The cut bacterial cellulose hydrogel cube was boiled in boiling water for 10 min, and then the sample was homogenized using a high-speed disperser at 10000 rpm for 10 min, to obtain a bacterial cellulose microfibril aqueous solution.

The bacterial cellulose microfibril aqueous solution was adjusted to a solid content of 1.0 wt %. Then, the solution was homogenized 20 times through the microtubule channel in a high-pressure homogenizer at a pressure of 160 MPa.

The bacterial cellulose microfibril aqueous solution was adjusted to a solid content of 9 wt %, and then 0.4 wt % of carboxymethyl cellulose was added, to obtain a uniformly dispersed bacterial cellulose microfibril aqueous solution. The purified and loosen to open bacterial cellulose microfibers had an average diameter of 30 nm, an average length of 20 μm, and a crystallinity of 70%.

(3) 0.9 wt % sodium alginate and 5 wt % zinc acetate were added to the uniformly dispersed bacterial cellulose microfibril aqueous solution, respectively, and heated at 60° C. for 7 h, to obtain a nano-zinc oxide-supported bacterial cellulose microfibril aqueous solution, wherein nano-zinc oxides are spherical particle with an average particle diameter of 20 nm, which are uniformly distributed on the surface of bacterial cellulose microfibers.

(4) The sodium alginate aqueous solution was wet-spun to form alginate fibers having a diameter of 9 μm in a calcium chloride coagulation bath. Then, the alginate fibers were processed by a spunlace method to obtain an alginate fiber spunlace non-woven fabric with a gram weight of 80 g/m² is obtained by processing by spunlace method.

The nano-zinc oxide-supported bacterial cellulose microfibril aqueous solution in step (3) was put into an autoclave, and the content of nano-zinc oxide-supported bacterial cellulose microfibers in the system was adjusted to 12 wt %. Under a high temperature of 121° C. and high pressure of 0.12 MPa, a sterilization was carried out for 15 min, to obtain a sterilized nano-zinc oxide-supported bacterial cellulose microfibril aqueous solution.

The alginate fiber spunlace non-woven fabric was immersed in the sterilized nano-zinc oxide-supported bacterial cellulose microfibril aqueous solution at room temperature for 24 h. After being taken out, it was freeze-dried to obtain the nano-zinc oxide-supported bacterial cellulose microfiber-alginate fiber composite.

Example 3

This example provides a production method of a nano-zinc oxide-supported bacterial cellulose microfiber-alginate fiber composite, comprising the following steps:

(1) A bacterial cellulose hydrogel was obtained by fermentation of Sporosarcina. At 80° C., the bacterial cellulose hydrogel was immersed in 0.5 wt % NaOH aqueous solution for 3 h, and then immersed in 3 wt % sodium dodecyl sulfate aqueous solution for 3 h. It was then repeatedly rinsed with distilled water until neutral to remove the bacterial proteins on the bacterial celluloses and the residual medium adhering to the cellulose membrane, to obtain the purified bacterial cellulose hydrogel.

(2) The purified bacterial cellulose hydrogel was cut into a cube with a side length of 0.7 cm. The cut bacterial cellulose hydrogel cube was boiled in boiling water for 15 min, and then the sample was homogenized using a high-speed disperser at 15000 rpm for 8 min, to obtain a bacterial cellulose microfibril aqueous solution.

The bacterial cellulose microfibril aqueous solution was adjusted to a solid content of 1.2 wt %. Then, the solution was homogenized 30 times through the microtubule channel in a high-pressure homogenizer at a pressure of 150 MPa.

The bacterial cellulose microfibril aqueous solution was adjusted to a solid content of 8 wt %, and then 0.3 wt % of carboxymethyl cellulose was added, to obtain a uniformly dispersed bacterial cellulose microfibril aqueous solution. The purified and loosen to open bacterial cellulose microfibers had an average diameter of 30 nm, an average length of 15 μm, and a crystallinity of 70%.

(3) 0.8 wt % sodium alginate and 4 wt % zinc acetate were added to the uniformly dispersed bacterial cellulose microfibril aqueous solution, respectively, and heated at 50° C. for 8 h, to obtain a nano-zinc oxide-supported bacterial cellulose microfibril aqueous solution, wherein nano-zinc oxides are spherical particle with an average particle diameter of 15 nm, which are uniformly distributed on the surface of bacterial cellulose microfibers.

(4) The sodium alginate aqueous solution was wet-spun to form alginate fibers having a diameter of 7 μm in a calcium chloride coagulation bath. Then, the alginate fibers were processed by a spunlace method to obtain an alginate fiber spunlace non-woven fabric with a gram weight of 60 g/m² is obtained by processing by spunlace method.

The nano-zinc oxide-supported bacterial cellulose microfibril aqueous solution in step (3) was put into an autoclave, and the content of nano-zinc oxide-supported bacterial cellulose microfibers in the system was adjusted to 14 wt %. Under a high temperature of 121° C. and high pressure of 0.12 MPa, a sterilization was carried out for 20 min, to obtain a sterilized nano-zinc oxide-supported bacterial cellulose microfibril aqueous solution.

The alginate fiber spunlace non-woven fabric was immersed in the sterilized nano-zinc oxide-supported bacterial cellulose microfibril aqueous solution at room temperature for 18 h. After being taken out, it was freeze-dried to obtain the nano-zinc oxide-supported bacterial cellulose microfiber-alginate fiber composite.

Example 4

This example provides a production method of a nano-zinc oxide-supported bacterial cellulose microfiber-alginate fiber composite, comprising the following steps:

(1) A bacterial cellulose hydrogel was obtained by fermentation of Pseudomonas. At 70° C., the bacterial cellulose hydrogel was immersed in 0.6 wt % NaOH aqueous solution for 3 h, and then immersed in 4 wt % sodium dodecyl sulfate aqueous solution for 3 h. It was then repeatedly rinsed with distilled water until neutral to remove the bacterial proteins on the bacterial celluloses and the residual medium adhering to the cellulose membrane, to obtain the purified bacterial cellulose hydrogel.

(2) The purified bacterial cellulose hydrogel was cut into a cube with a side length of 0.8 cm. The cut bacterial cellulose hydrogel cube was boiled in boiling water for 20 min, and then the sample was homogenized using a high-speed disperser at 20000 rpm for 7 min, to obtain a bacterial cellulose microfibril aqueous solution.

The bacterial cellulose microfibril aqueous solution was adjusted to a solid content of 1.4 wt %. Then, the solution was homogenized 40 times through the microtubule channel in a high-pressure homogenizer at a pressure of 150 MPa.

The bacterial cellulose microfibril aqueous solution was adjusted to a solid content of 7 wt %, and then 0.3 wt % of carboxymethyl cellulose was added, to obtain a uniformly dispersed bacterial cellulose microfibril aqueous solution. The purified and loosen to open bacterial cellulose microfibers had an average diameter of 40 nm, an average length of 15 μm, and a crystallinity of 65%.

(3) 0.7 wt % sodium alginate and 4 wt % zinc acetate were added to the uniformly dispersed bacterial cellulose microfibril aqueous solution, respectively, and heated at 50° C. for 9 h, to obtain a nano-zinc oxide-supported bacterial cellulose microfibril aqueous solution, wherein nano-zinc oxides are spherical particle with an average particle diameter of 10 nm, which are uniformly distributed on the surface of bacterial cellulose microfibers.

(4) The sodium alginate aqueous solution was wet-spun to form alginate fibers having a diameter of 6 μm in a calcium chloride coagulation bath. Then, the alginate fibers were processed by a spunlace method to obtain an alginate fiber spunlace non-woven fabric with a gram weight of 40 g/m$^2$ is obtained by processing by spunlace method.

The nano-zinc oxide-supported bacterial cellulose microfibril aqueous solution in step (3) was put into an autoclave, and the content of nano-zinc oxide-supported bacterial cellulose microfibers in the system was adjusted to 16 wt %. Under a high temperature of 121° C. and high pressure of 0.12 MPa, a sterilization was carried out for 20 min, to obtain a sterilized nano-zinc oxide-supported bacterial cellulose microfibril aqueous solution.

The alginate fiber spunlace non-woven fabric was immersed in the sterilized nano-zinc oxide-supported bacterial cellulose microfibril aqueous solution at room temperature for 18 h. After being taken out, it was freeze-dried to obtain the nano-zinc oxide-supported bacterial cellulose microfiber-alginate fiber composite.

Example 5

This example provides a production method of a nano-zinc oxide-supported bacterial cellulose microfiber-alginate fiber composite, comprising the following steps:

(1) A bacterial cellulose hydrogel was obtained by fermentation of *Acetobacter xylinum*, *Achromobacter* and *Alcaligenes*. At 100° C., the bacterial cellulose hydrogel was immersed in 0.7 wt % NaOH aqueous solution for 2 h, and then immersed in 5 wt % sodium dodecyl sulfate aqueous solution for 2 h. It was then repeatedly rinsed with distilled water until neutral to remove the bacterial proteins on the bacterial celluloses and the residual medium adhering to the cellulose membrane, to obtain the purified bacterial cellulose hydrogel.

(2) The purified bacterial cellulose hydrogel was cut into a cube with a side length of 0.9 cm. The cut bacterial cellulose hydrogel cube was boiled in boiling water for 25 min, and then the sample was homogenized using a high-speed disperser at 25000 rpm for 5 min, to obtain a bacterial cellulose microfibril aqueous solution.

The bacterial cellulose microfibril aqueous solution was adjusted to a solid content of 1.8 wt %. Then, the solution was homogenized 50 times through the microtubule channel in a high-pressure homogenizer at a pressure of 130 MPa.

The bacterial cellulose microfibril aqueous solution was adjusted to a solid content of 6 wt %, and then 0.2 wt % of carboxymethyl cellulose was added, to obtain a uniformly dispersed bacterial cellulose microfibril aqueous solution. The purified and loosen to open bacterial cellulose microfibers had an average diameter of 40 nm, an average length of 10 μm, and a crystallinity of 60%.

(3) 0.6 wt % sodium alginate and 3 wt % zinc acetate were added to the uniformly dispersed bacterial cellulose microfibril aqueous solution, respectively, and heated at 40° C. for 10 h, to obtain a nano-zinc oxide-supported bacterial cellulose microfibril aqueous solution, wherein nano-zinc oxides are spherical particle with an average particle diameter of 10 nm, which are uniformly distributed on the surface of bacterial cellulose microfibers.

(4) The sodium alginate aqueous solution was wet-spun to form alginate fibers having a diameter of 5 μm in a calcium chloride coagulation bath. Then, the alginate fibers were processed by a spunlace method to obtain an alginate fiber spunlace non-woven fabric with a gram weight of 45 g/m$^2$ is obtained by processing by spunlace method.

The nano-zinc oxide-supported bacterial cellulose microfibril aqueous solution in step (3) was put into an autoclave, and the content of nano-zinc oxide-supported bacterial cellulose microfibers in the system was adjusted to 18 wt %. Under a high temperature of 121° C. and high pressure of 0.12 MPa, a sterilization was carried out for 30 min, to obtain a sterilized nano-zinc oxide-supported bacterial cellulose microfibril aqueous solution.

The alginate fiber spunlace non-woven fabric was immersed in the sterilized nano-zinc oxide-supported bacterial cellulose microfibril aqueous solution at room temperature for 12 h. After being taken out, it was freeze-dried to obtain the nano-zinc oxide-supported bacterial cellulose microfiber-alginate fiber composite.

Example 6

This example provides a production method of a nano-zinc oxide-supported bacterial cellulose microfiber-alginate fiber composite, comprising the following steps:

(1) a bacterial cellulose hydrogel was obtained by fermentation of Aerobacter and *Azotobacter*. At 100° C., the bacterial cellulose hydrogel was immersed in 1 wt % NaOH aqueous solution for 2 h, and then immersed in 6 wt % sodium dodecyl sulfate aqueous solution for 2 h. It was then repeatedly rinsed with distilled water until neutral to remove the bacterial proteins on the bacterial celluloses and the residual medium adhering to the cellulose membrane, to obtain the purified bacterial cellulose hydrogel.

(2) The purified bacterial cellulose hydrogel was cut into a cube with a side length of 1 cm. The cut bacterial cellulose hydrogel cube was boiled in boiling water for 30 min, and then the sample was homogenized using a high-speed disperser at 15000 rpm for 5 min, to obtain a bacterial cellulose microfibril aqueous solution.

The bacterial cellulose microfibril aqueous solution was adjusted to a solid content of 2 wt %. Then, the solution was homogenized 60 times through the microtubule channel in a high-pressure homogenizer at a pressure of 130 MPa.

The bacterial cellulose microfibril aqueous solution was adjusted to a solid content of 5 wt %, and then 0.2 wt % of carboxymethyl cellulose was added, to obtain a uniformly dispersed bacterial cellulose microfibril aqueous solution. The purified and loosen to open bacterial cellulose microfibers had an average diameter of 40 nm, an average length of 15 μm, and a crystallinity of 65%.

(3) 0.5 wt % sodium alginate and 3 wt % zinc acetate were added to the uniformly dispersed bacterial cellulose microfibril aqueous solution, respectively, and heated at 40° C. for 12 h, to obtain a nano-zinc oxide-supported bacterial cellulose microfibril aqueous solution, wherein nano-zinc oxides are spherical particle with an average particle diameter of 5 nm, which are uniformly distributed on the surface of bacterial cellulose microfibers.

(4) The sodium alginate aqueous solution was wet-spun to form alginate fibers having a diameter of 10 μm in a calcium chloride coagulation bath. Then, the alginate fibers were processed by a spunlace method to obtain an alginate fiber spunlace non-woven fabric with a gram weight of 55 g/m² is obtained by processing by spunlace method.

The nano-zinc oxide-supported bacterial cellulose microfibril aqueous solution in step (3) was put into an autoclave, and the content of nano-zinc oxide-supported bacterial cellulose microfibers in the system was adjusted to 20 wt %. Under a high temperature of 121° C. and high pressure of 0.12 MPa, a sterilization was carried out for 30 min, to obtain a sterilized nano-zinc oxide-supported bacterial cellulose microfibril aqueous solution.

The alginate fiber spunlace non-woven fabric was immersed in the sterilized nano-zinc oxide-supported bacterial cellulose microfibril aqueous solution at room temperature for 12 h. After being taken out, it was freeze-dried to obtain the nano-zinc oxide-supported bacterial cellulose microfiber-alginate fiber composite.

Performance Test Experiments:

The following performance tests were performed on the nano-zinc oxide-supported bacterial cellulose microfiber-alginate fiber composite prepared in Example 1.

Biocompatibility test: in accordance with GB/T 16886 Biological evaluation of medical devices, the composite (Example 1) was evaluated for cytotoxicity, delayed contact sensitization in guinea pigs, skin irritation, etc.

Cytotoxicity test was performed in accordance with GB/T 16886-5 "Biological evaluation of medical devices—Part 5: Tests for in vitro cytotoxicity"; delayed contact sensitization in guinea pigs test was performed in accordance with GB/T 16886-10 "Biological evaluation of medical devices—Part 10: Tests for irritation and delayed-type hypersensitivity", using the maximum test Magnusson and Kligman method; skin irritation test was performed in accordance with GB/T 16886-10 "Biological evaluation of medical devices—Part 10: Tests for irritation and delayed-type hypersensitivity".

The results show that the composite (Example 1) has a cytotoxicity of less than grade 2, no skin sensitization response and no intradermal irritation response, and has good biological safety.

Antibacterial Performance Test:

The composite was tested in accordance with GB/T 20944.1-2007 "Textiles—Evaluation for antibacterial activity—Part 1: Agar diffusion plate method". According to the standard, a sample would be considered to have a good antibacterial effect if the width of the antibacterial zone of the experimental sample is greater than 1 mm. The experimental results show that the antibacterial band widths of the composite of the present invention (Example 1) to *Escherichia coli* ATCC 8739 and Staphylicoccus *aureus* ATCC 6538 were 9 mm and 12 mm, respectively, indicating that the samples had good antibacterial properties.

What is claimed is:

1. A production method for a nano-zinc oxide-supported bacterial cellulose microfiber-alginate fiber composite comprising:
   dispersing a bacterial cellulose hydrogel in water to obtain a uniformly dispersed bacterial cellulose microfibril aqueous solution;
   adding sodium alginate and zinc salt to the bacterial cellulose microfibril aqueous solution, and then subjecting to a heating treatment, to obtain a nano-zinc oxide-supported bacterial cellulose microfibril aqueous solution; and
   immersing an alginate fiber spunlace non-woven fabric into the nano-zinc oxide-supported bacterial cellulose microfibril aqueous solution, and then freeze-drying, to obtain the nano-zinc oxide-supported bacterial cellulose microfiber-alginate fiber composite.

2. The production method according to claim 1, wherein the mass ratio of the bacterial cellulose microfibers, the sodium alginate and the zinc salt in the bacterial cellulose microfibril aqueous solution is (5-10):(0.5-1):(3-5).

3. The production method according to claim 1, wherein the zinc salt comprises one or a combination of more of zinc acetate, zinc nitrate, zinc bromide, zinc chloride and zinc sulfate.

4. The production method according to claim 1, wherein the heating treatment is performed at a temperature of 40° C.-60° C. for 6-12 h.

5. The production method according to claim 1, wherein the bacterial cellulose hydrogel is obtained by fermentation of strains; and the strains comprise one or a combination of more of *Acetobacter xylinum, Rhizobium, Sporosarcina, Pseudomonas, Achromobacter, Alcaligenes*, Aerobacter, and *Azotobacter*.

6. The production method according to claim 5, wherein the bacterial cellulose hydrogel obtained by fermentation is further purified as follows:
   immersing the bacterial cellulose hydrogel in an NaOH aqueous solution with a mass percentage of 0.3%-1% at a temperature of 70-100° C. for 2-4 h, and then immersing the bacterial cellulose hydrogel in a sodium dodecyl sulfate aqueous solution with a mass percentage of 1%-5%; subsequently, repeatedly rinsing the bacterial cellulose hydrogel with distilled water until neutral to remove the bacterial proteins on the bacterial celluloses and the residual medium adhering to the cellulose membrane, to obtain a purified bacterial cellulose hydrogel.

7. The production method according to claim 1, wherein the bacterial cellulose hydrogel is dispersed in water as follows:
   cutting and boiling the bacterial cellulose hydrogel in water, and then homogenized in a high-speed disperser, to obtain a bacterial cellulose microfibril aqueous solution;
   subsequently, adjusting the bacterial cellulose microfibril aqueous solution to a solid content of 0.8-2 wt %, and then homogenized in a high-pressure homogenizer;
   subsequently, adjusting the bacterial cellulose microfibril aqueous solution to a solid content of 5-10 wt %, to obtain a uniformly dispersed bacterial cellulose microfibril aqueous solution.

8. The production method according to claim 7, further comprising adding 0.2-0.4 wt % carboxymethyl cellulose to the bacterial cellulose microfibril aqueous solution.

9. The production method according to claim 7, wherein the bacterial cellulose hydrogel is cut into shapes including a cube, a cuboid or a sphere.

10. The production method according to claim 9, wherein the bacterial cellulose hydrogel is cut into a cube with a side length of 0.5-1 cm.

11. The production method according to claim 7, wherein the cut bacterial cellulose hydrogel is boiled for 10-30 min.

12. The production method according to claim 7, wherein the homogenization is performed in the high-speed disperser at a 5000-25000 rpm for 5-10 min;
the homogenization is performed in 10-60 times through the microtubule channel in the high-pressure homogenizer at a pressure of 130-170 MPa.

13. The production method according to claim 7, wherein the alginate fiber spunlace non-woven fabric is a non-woven fabric obtained by processing alginate fibers by a spunlace method.

14. The production method according to claim 13, wherein the alginate fibers are those obtained by wet-spinning the sodium alginate aqueous solution and then forming alginate fibers in a calcium chloride coagulation bath, wherein the fibers have a diameter of 5-10 μm.

15. The production method according to claim 1, wherein the alginate fiber spunlace non-woven fabric is immersed in the nano-zinc oxide-supported bacterial cellulose microfibril aqueous solution at room temperature for 12-24 h.

16. The production method according to claim 15, wherein a solid content of nano-zinc oxide-supported bacterial cellulose microfibrils in the nano-zinc oxide-supported bacterial cellulose microfibril aqueous solution is further adjusted by an autoclave prior to immersing, such that the solid content of the nano-zinc oxide-supported bacterial cellulose microfibers in the nano-zinc oxide-supported bacterial cellulose microfibril aqueous solution is 10-20 wt %.

17. The production method according to claim 16, wherein the nano-zinc oxide- supported bacterial cellulose microfibers in the nano-zinc oxide-supported bacterial cellulose microfibril aqueous solution is sterilized at a temperature of 121° C. and a pressure of 0.12 MPa for 15-30 min.

* * * * *